(No Model.)
F. IMHORST.
Machine for Handling Articles in Bulk.
No. 233,623. Patented Oct. 26, 1880.
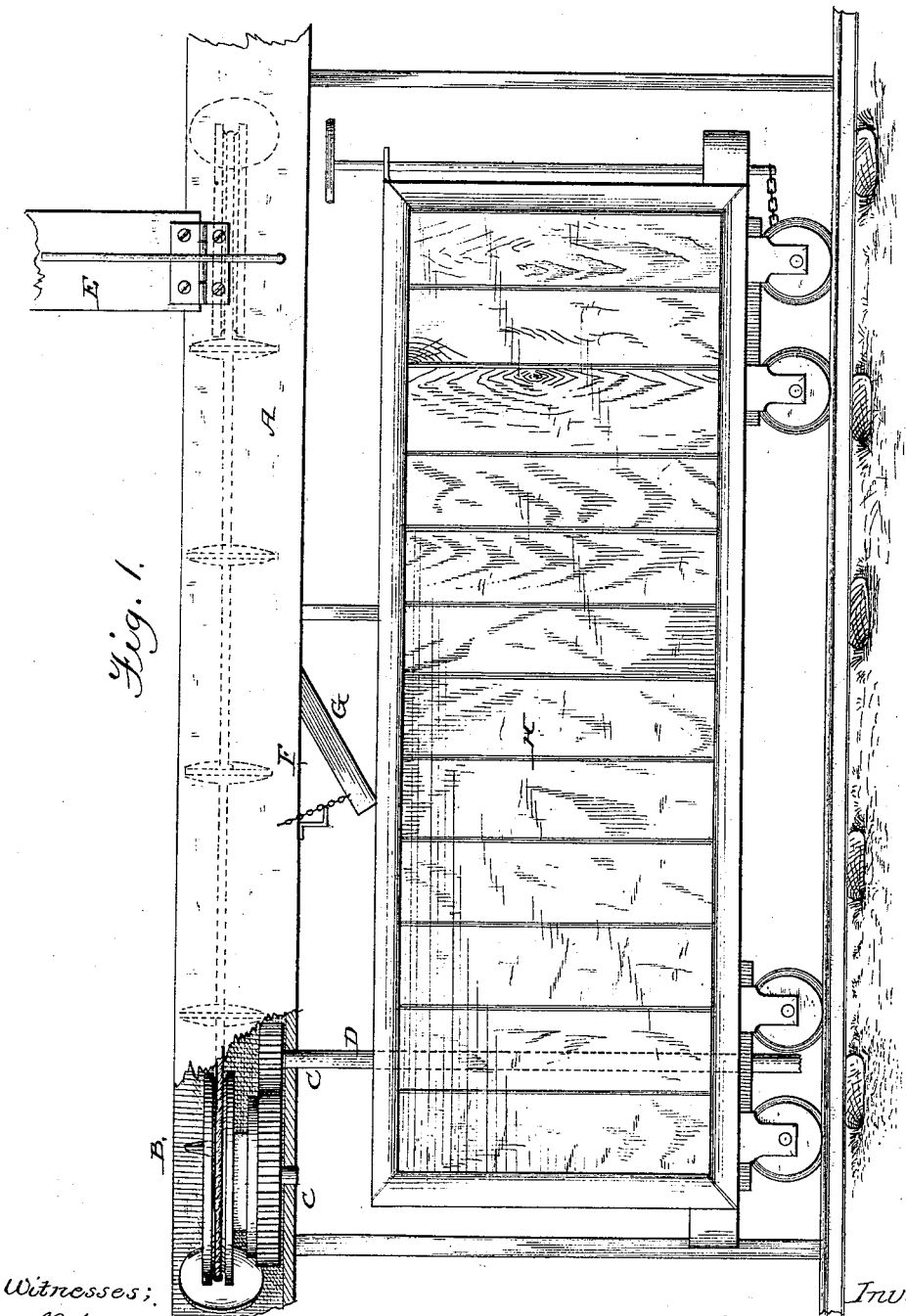

(No Model.)  F. IMHORST.  4 Sheets—Sheet 2.
Machine for Handling Articles in Bulk.
No. 233,623.  Patented Oct. 26, 1880.
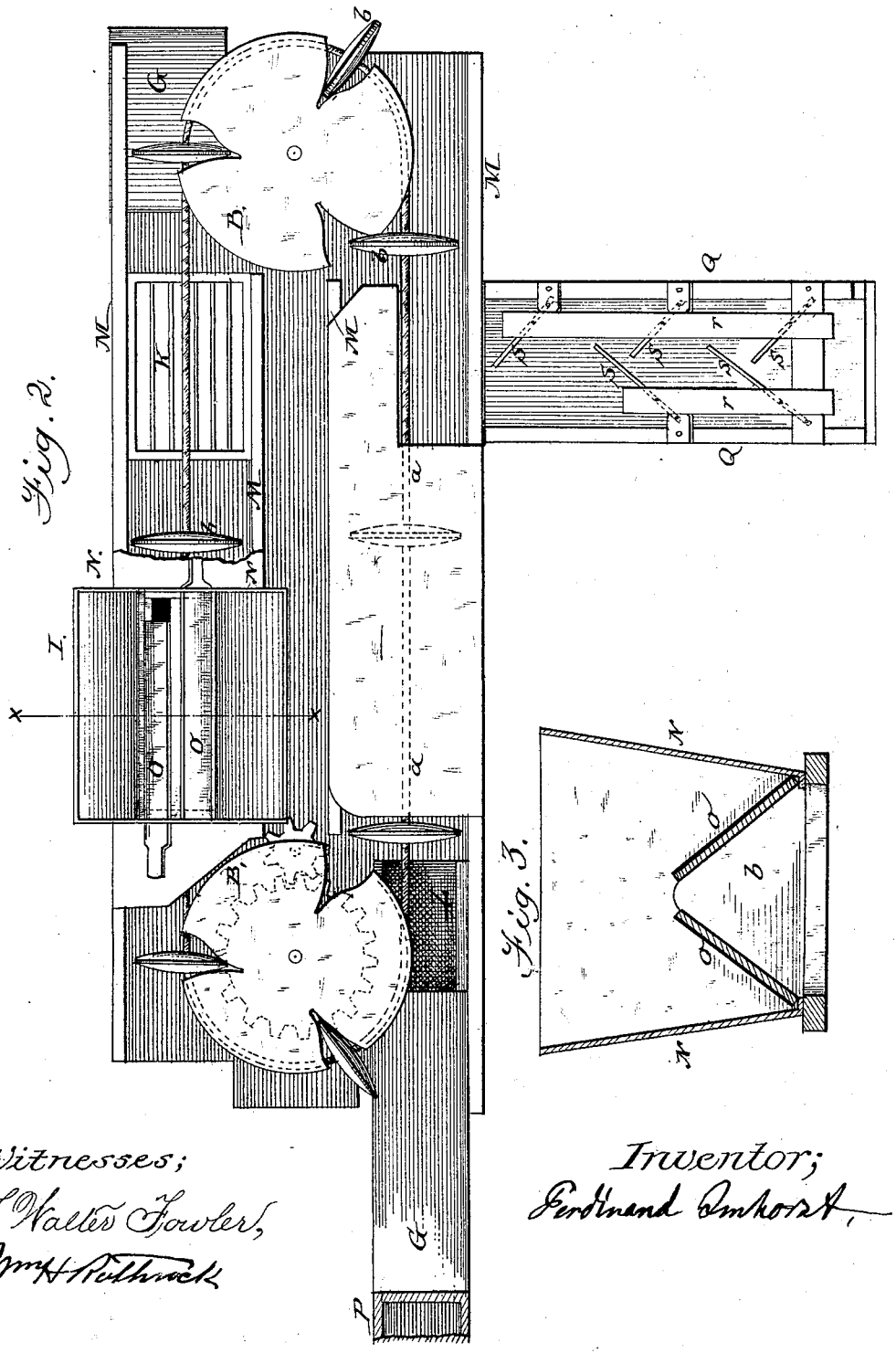

(No Model.) 4 Sheets—Sheet 3.
F. IMHORST.
Machine for Handling Articles in Bulk.
No. 233,623. Patented Oct. 26, 1880.
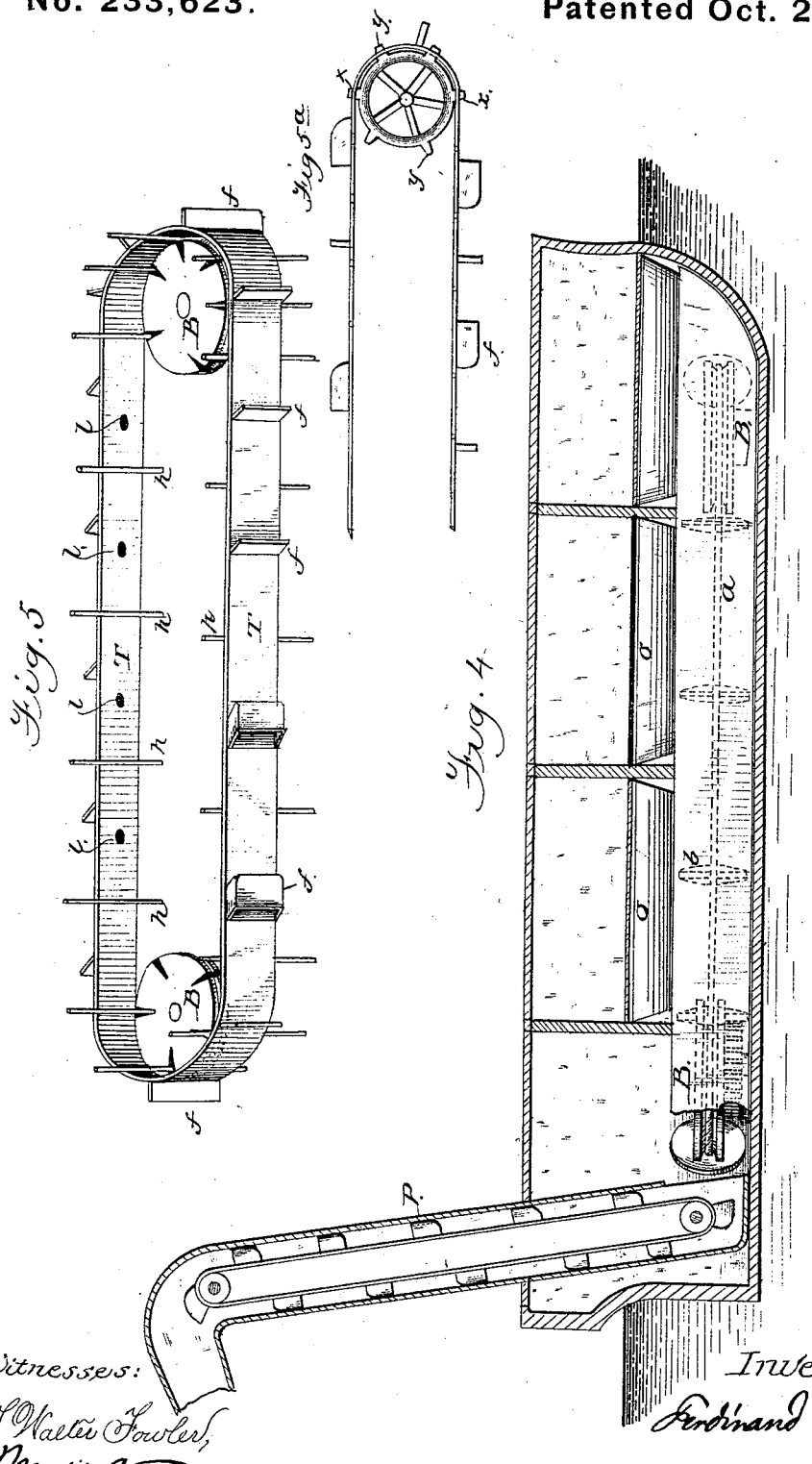

(No Model.) 4 Sheets—Sheet 4.
F. IMHORST.
Machine for Handling Articles in Bulk.
No. 233,623. Patented Oct. 26, 1880.
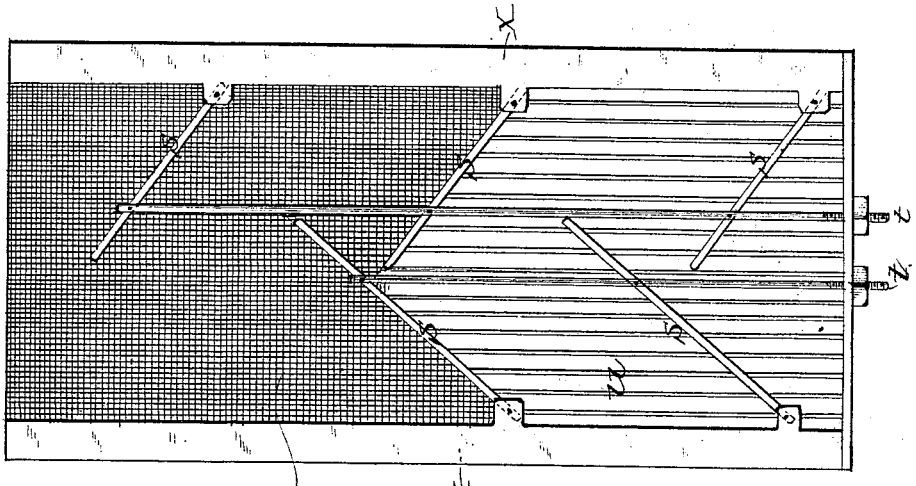
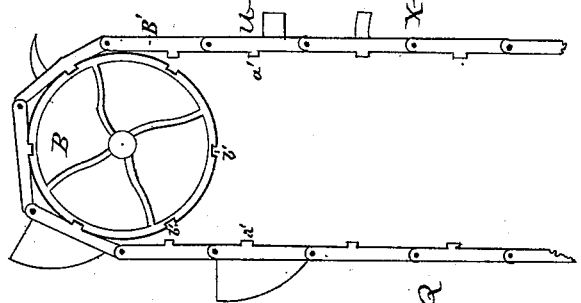
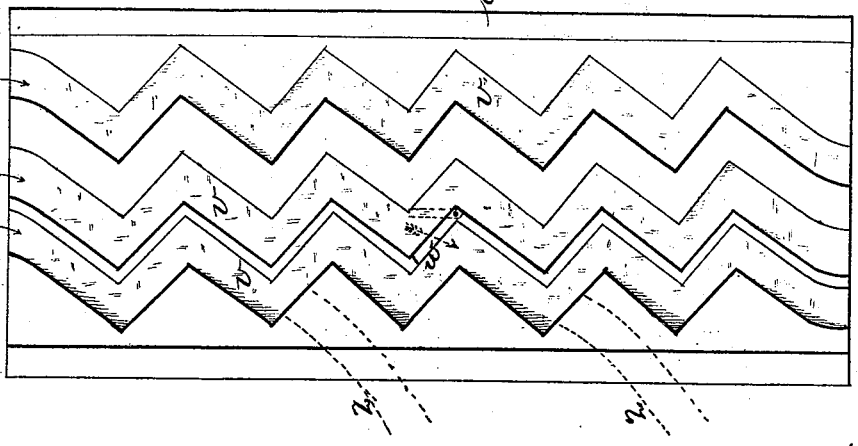
Witnesses:
J. Walter Fowler,
Wm H Rothrock
Inventor:
Ferdinand Imhorst

UNITED STATES PATENT OFFICE.

FERDINAND IMHORST, OF BALTIMORE, MARYLAND.

MACHINE FOR HANDLING ARTICLES IN BULK.

SPECIFICATION forming part of Letters Patent No. 233,623, dated October 26, 1880.

Application filed August 18, 1880. (No model.)

*To all whom it may concern:*

Be it known that I, FERDINAND IMHORST, a citizen of the United States, residing in the city of Baltimore, in the State of Maryland, have invented new and useful Improvements in Machinery for Handling Articles in Bulk, such as coal, grain, ores, earth, gravel, or the like, of which the following is a specification.

My invention consists in improvements in machinery and devices for lifting, conveying, lowering, separating, and distributing articles in bulk by means of an elevator having attachments for feeding the buckets while in motion, said machinery and devices acting as conveyers, separators, and distributers, and devices for lowering and separating articles in bulk.

The first feature of these improvements consists in the combination of an elevator and conveyer for feeding to the buckets of the elevator.

The second feature of the improvements consists in combining mechanism and devices to form a conveyer. The conveyer consists of a combined endless or extension belt, band, chain, rope, or the like, with projections, as buckets, disks, cross-bars, depressions, perforations, or the like, with pulley-wheels and other devices, as shown. To be used in combination with the conveyer and the casing thereof are devices, such as screens, sieve, grating, and chute. By means of devices and beltings the articles in bulk are moved over the screens, sieve, or grating, and the larger particles are thereby separated from the smaller. The large particles remaining within the conveyer are finally moved to an opening within the casing of the conveyer, through which they find ready egress.

To facilitate the withdrawing of the contents of a box, bin, vessel, wagon, or other receptacle, I have placed the conveyer near the bottom in such a manner that the contents of the bin, &c., may fall gradually through an opening or passage leading to the belt of the conveyer, and thus be finally removed by same.

The passage leading from the receptacle to the conveyer may be closed by a door or gate, as required.

Whenever the conveyer is to be used for moving, separating, and distributing articles in bulk—for instance, to the bin of a vessel or a train of railroad-cars or other receptacles—then the conveyer and devices connecting are elevated above the railroad-cars, &c., as desirable for the purposes.

The other feature of my improvements consists in devices used as chute, but forming a zigzag channel. The walls of the channels are either in sections, movable, adjustable, or stationary. By the formation of the zigzag channel a uniform velocity of fall of the articles, or nearly so, is obtained, thereby causing less damage to articles of value or to machinery. The walls of the zigzag channels of the chute are made of wood or metal, stationary or movable, solid or perforated, with or without screens or bars, as may be required.

The lowering of the material all in bulk for separating the larger particles from the smaller, or to change the current of articles from one channel into another, is done by means of movable sections, doors, or gates connecting with the walls of the channel.

Figure 1 shows the vertical section of the conveyer, consisting of devices and machinery shown as supplying a railroad-car. Fig. 2 shows top view of the conveyer—viz., the pulleys, chain, or rope—with disks or projections, chute, and elevator. Secured to sections of the casing are perforated plates, wire screens, or bars, gates or doors protecting the opening of the passage leading from the box or bin to the conveyer; also, chute with movable slides or arms and connecting devices, forming a zigzag channel. Fig. 3 shows the vertical cross-section of a bin, box, or the like, the sloping or slanting section of bottom or sides and the gates or doors protecting the opening of the passage leading to the conveyer. Fig. 4 shows the vertical longitudinal section of a vessel, the machinery and devices constituting the conveyer, the gates or doors protecting the mouth of the passage leading from the bin to the conveyer and the elevator. Fig. 5 shows a band or belt having in combination with and secured to it the cross-bars, which fit into corresponding depressions or the side flanges thereof; also, projections and bucket for moving the articles. Fig. 5ª shows perforations or depressions $x$ in or through the belt or band and fitting corresponding projections $y$ of a pulley-wheel, in combination with projections and buckets secured to the belt or band. Fig. 6 shows a plan view of a chute with perforated casing, (wire cloth or bars,) in combination with devices shown as movable arms or slides secured to the casing of the chute, and connecting-bars to secure and regulate the pitch of the arms or slides at suitable angles, thereby enabling the formation of a zigzag channel. Fig. 7 shows a plan view of a chute having the walls of the channels stationary and curved to a zigzag. Sections of the walls of the channels are movable, or provided with openings, which are to be closed by gates or doors to enable the operator to change the current of the articles from one channel into another, as required. Fig. 8 shows a bar-chain having projections on the hinged plates, which fit into corresponding recesses on the pulley.

In Fig. 1, the letter A shows the casing of the conveyer, made of wood or metal. Letter $a$ shows the chain, rope, belt, or the like. In combination and secured to it are disks or projections $b$, used for moving the articles to advantage. The belt, chain, or rope is suspended and set in motion by pulley-wheels B, which, in turn, are secured to and set in motion by cogged wheels C, shafting D forming the part of the connection between the engine and the conveyer proper. The conveyer is supplied with articles in bulk by means of chute E, to be forwarded to opening F of the casing of the conveyer and lowered and directed by means of chute G into the railroad-car H.

In Fig. 2, letter B shows the pulleys as being notched, receiving the projections or disks $b$ and the belt, chain, or rope $a$. These devices, when set in motion, will move the articles over grating K and perforated plates or wire-cloth L, thereby separating the smaller particles from the larger. The remainder are moved toward chutes G, which, forming the connecting-link between the conveyer and elevator, will forward the articles to the buckets of the elevator.

Chute Q, I have provided with movable arms or slides S, whose ends are secured to the casing of the chute. The arms or slides S are pivoted to connecting-rods $r$. By moving the rods $r$ upward the arms S are brought into position to form a zigzag channel. By moving the rods $r$ downward the arms are lowered, the zigzag channel widened or opened entirely by laying the arms flat against the sides of the casing.

Fig. 3 shows the sloping sections or slides N of a bin, box, wagon, car, or other receptacle, used in combination with the gate or door O, which, covering the opening of the passage leading to the belt and connecting devices of the conveyer, prevents, but when removed will admit of, the passage of the particles from the bin to the conveyer.

Fig. 4 represents a vertical longitudinal section of a vessel, and shows the gates O as covering the mouth of the passage connecting the bin with the conveyer and leading to the belt $a$, and connecting devices of the conveyer, moving the particles to the buckets of the elevator P, to be lifted, finally, outside the vessel.

In Fig. 5 is shown belt T, made of metal, leather, or other suitable material, to prevent it slipping when slack over the pulleys B. I have combined and secured to the belt the cross-bars $h$, which, fitting into corresponding depressions of the pulleys B or the side flanges of the pulley-wheel B, will thereby effectually prevent the slipping of the belt. To increase the effectiveness of the belt as a conveyer I have combined and secured to same projections and buckets $f$, thereby increasing its effectiveness for moving particles.

In place of cross-bars used in combination with belting, I use a perforated belt, $l$, or one with depressions instead of holes $l$ fitting corresponding projections $l'$ of pulley-wheel B', and used in combination with projections or buckets $f$, as shown in Fig. 5$^a$.

Fig. 6 shows the combination of perforated section of the casing of a chute, or screens, or bars U with movable slides or arms S and connecting-rods $t$. By means of devices, as shown, a zigzag channel can be formed of smaller or larger dimensions, as required. The letter X shows solid beams, to which the perforated plates, screens, bars, arms, or slides are to be secured. The slides S are made of solid or perforated plates or boards.

In Fig. 7, the letter Q shows the casing of chute; letter V, the zigzag channels, made of metal or wood.

W shows a movable gate, door, or section of the wall of channels, by means of which the current of the articles can be directed from one channel to the connecting-channel or to pipes Z, shown as connecting with the chute.

In Fig. 8, B designates the pulley having recesses $b'$. B' are the hinged plates composing the chain, each plate being provided with projection $a'$, which fits into the recess $b'$ on the pulley B.

What I claim, and desire to secure by Letters Patent, is—

1. The combination of a chain, rope, or equivalent device with disks or projections, or belt or band T, and mechanism, thereby forming a conveyer, substantially as described.

2. The combination of the conveyer with an elevator, substantially as described.

3. The belt or band T, in combination with projections or buckets, for the purposes as set forth.

4. In combination with an elevator or conveyer, the belt or band T, provided with cross-bars or projections, substantially as described.

5. The pulley B, having depressions or projections corresponding to the belt or band T, or cross-bars or projections, or depressions of the pulley corresponding with and adapted to the projections of a bar-chain, or hinged plates forming a chain, or of the chain, rope, or its equivalent device, having disks or projections, for the purposes as set forth.

6. A bar-chain or hinged plates forming a chain, in combination with projections or buckets, for the purposes as set forth.

7. The combination of the casing of the conveyer with doors, perforated plates, screens, gratings, or equivalents, for the purposes as set forth.

8. The conveyer, in combination with a chute, substantially as described.

9. The combination, with the conveyer, as shown, of the box, bin, channel, pocket, or its equivalent, whether formed separately or upon a wagon or railroad-car, or in or with a storehouse, vessel, yard, furnace, factory, mine, or equivalent, substantially as described.

10. The combination of arms or slides and the casings of a chute, or pipe, or channel, substantially as described.

11. A chute with movable arms or slides, whereby a zigzag channel is or can be formed, in combination with perforated sections of casing, or of the side walls, or screens, or bars, for the purposes as set forth.

12. A chute having stationary zigzag channels, in combination with perforated sections of casing, or screens, or bars, for the purposes as set forth.

13. The casing or walls of the channels used as chutes, in combination with movable sections of the walls of the channels, or doors, or gates, substantially as described.

FERDINAND IMHORST.

Witnesses:
JOHN J. STAYLOR,
WILLIAM H. RATHROCK.